United States Patent [19]
Hosmer et al.

[11] Patent Number: 5,726,908
[45] Date of Patent: Mar. 10, 1998

[54] LIQUID QUANTITY SENSOR AND METHOD

[75] Inventors: Thomas Prince Hosmer, Concord; Izrail Tsals, Sudbury; Wendy Power, Westford; Michael A. Reed, Chelmsford, all of Mass.

[73] Assignee: Figgie International Inc., Willoughby, Ohio

[21] Appl. No.: 406,696

[22] Filed: Mar. 20, 1995

[51] Int. Cl.⁶ ............................................. G01F 23/26
[52] U.S. Cl. .................... 364/509; 73/304 C; 361/284
[58] Field of Search ................ 73/304 C, 290 R, 73/199, 1 D, 1 H, 510, 500, 514.05, 1.73, 1.75; 33/366, 365, 377; 367/908; 340/612, 618, 620, 689, 686; 361/276, 284; 324/663, 664, 686, 689; 364/509, 566, 559; 116/109; 200/61.45 R, 61.52

[56] References Cited

U.S. PATENT DOCUMENTS

| | | | |
|---|---|---|---|
| 3,943,767 | 3/1976 | Efferson | 73/295 |
| 4,020,690 | 5/1977 | Samuels et al. | 73/299 |
| 4,194,395 | 3/1980 | Wood | 73/304 C |
| 4,417,473 | 11/1983 | Tward et al. | 73/304 C |
| 4,428,232 | 1/1984 | Tanaka et al. | 73/304 |
| 4,589,077 | 5/1986 | Pope | 364/509 |
| 4,591,946 | 5/1986 | Pope | 361/284 |
| 4,844,117 | 7/1989 | Sung | 137/386 |
| 4,873,832 | 10/1989 | Porter | 62/49 |
| 4,912,662 | 3/1990 | Butler et al. | 364/559 |
| 5,001,927 | 3/1991 | LaCava et al. | 73/304 C |
| 5,018,387 | 5/1991 | Myneni | 73/295 |
| 5,095,747 | 3/1992 | Smith | 73/290 |
| 5,138,880 | 8/1992 | Lee et al. | 73/304 C |
| 5,144,907 | 9/1992 | Erwin et al. | 505/1 |
| 5,167,154 | 12/1992 | Lee | 73/295 |
| 5,230,439 | 7/1993 | Klok et al. | 220/420 |
| 5,275,007 | 1/1994 | Neeser | 62/49.2 |
| 5,357,758 | 10/1994 | Andonian | 62/45.1 |
| 5,423,214 | 6/1995 | Lee | 73/304 C |

OTHER PUBLICATIONS

Cyrogenics, vol. 30, No. 6, Jun. 1990, Gulford GB, pp. 538–544, X PO00127927 I.V. Velichkov et al. "Capacitive Level Meters For Cryogenic Liquids With Continuous Read–Out".

Cyrogenics, vol. 24, No. 2, Feb. 1984, Guildford GB pp. 63–66 XP002006088 K.–J. Kugler et al. "Non–power–Dissipating Continuous Level Monitors For Liquid Nitrogen and Helium".

Primary Examiner—Emanuel T. Voeltz
Assistant Examiner—Tony M. Cole
Attorney, Agent, or Firm—Hodgson, Russ, Andrews, Woods & Goodyear LLP

[57] ABSTRACT

A sensor apparatus is described that detects and indicates the quantity of cryogenic liquid in a Dewar container, independent of the spatial orientation and the physical motions acting on the container.

24 Claims, 5 Drawing Sheets

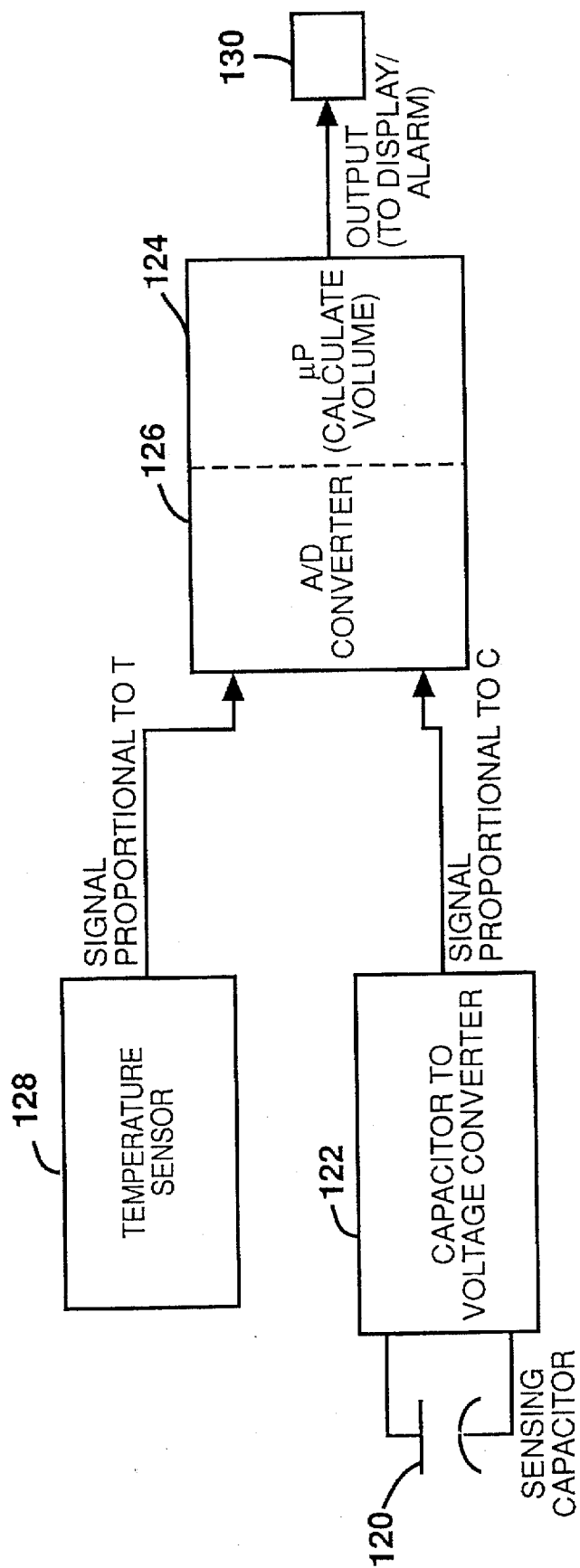

LIQUID QUANTITY SENSOR AND METHOD

BACKGROUND OF THE INVENTION

1. Field of the Invention

The present invention relates generally to a method and apparatus for detecting the quantity of liquid in a container such as a cryogenic liquid Dewar container independent of the spatial orientation and physical motions acting on the container.

The capacitance between two conducting members is proportional to the amount of opposite and therefore mutually attractive electrical charges that can be gathered on the conductors in the presence of an electrical potential differential. The resulting electric field that is set up between the conductors holds the opposite charges captive. The electrical storage capacity of an electrical capacitor can be changed by placing a foreign material between the conductors. Materials which have this property of changing the effective field strength and therefore the amount of electrical charge that is held on proximately spaced conductors are known as dielectrics. The ability of a particular dielectric medium to cause an increase in the charge holding capacity of conductors in response to a similar applied electric potential differential placed on a capacitor is characteristic of the medium's dielectric coefficient, i.e., the ratio of the charge holding capacity or capacitance when the conducting members are separated by the foreign material or dielectric medium and when the conductors are separated by vacuum. Dielectric coefficients can range from about one for air to as high as 80 for distilled water.

2. Prior Art

The measurement of capacitance between two proximately spaced conductors having a known dielectric medium there between is a well known technique that is extensively used in the gauging of a liquid level. U.S. Pat. No. 4,589,077 to Pope describes a liquid level measuring apparatus for a tank comprising an elongated multi-stage capacitance probe that includes a column of capacitors extending in a known direction through the liquid interface. By identifying the capacitor in the column at the liquid level and the capacitor directly below the liquid level, the height of the liquid level within the tank is computed. If the volume of the tank is known, the volume of liquid remaining in the tank can also be computed. This measuring apparatus requires that the tank is motionless and of a known relative orientation.

U.S. Pat. No. 4,428,232 to Tanaka et al. describes a capacitance liquid level detector comprising a pair of helically coiled electrodes extending vertically in a container and at least partially submerged in a liquid stored therein. The upper and lower ends of the coils are connected to the respective ends of the container. An oscillator circuit of the resistance capacity type having a variable condenser consisting of the electrodes is arranged to oscillate at a frequency that is dependent upon the variation of the electrostatic capacitance between the electrodes so as to indicate the level of the stored liquid. This detector apparatus requires that the storage container is of a known relative orientation.

Another type of cryogenic liquid level detector apparatus is set forth in U.S. Pat. No. 3,943,767 to Efferson. This patent describes a detector apparatus system that comprises a filament of superconducting material vertically positioned inside the Dewar. A current is passed through the filament and as the gas-liquid interface moves along the filament, the voltage generated is a measure of the level of the gas-liquid interface. This measuring apparatus also requires that the tank remain motionless during the measurement and have a known relative orientation.

Finally, U.S. Pat. No. 5,230,439 to Klok et al. describes a level detector comprising two elongate and parallel electrodes disposed inside a container. The electrodes are energized to provide a liquid level signal. This detector is not particularly useful for a container in motion and there is no means for indicating the inclination of the container.

A series of electrodes wrapped in a spiral pattern around a pipe along a portion of the length thereof has been suggested for the purpose of capacitive sensing gaseous fraction in two-phase flow of a fluid through the pipe. See "Capacitive Sensing of Gaseous Fraction in Two-Phase Flow," *NASA Tech Briefs*, January, 1995.

SUMMARY OF THE INVENTION

The present invention provides a sensor apparatus comprising detector means for detecting, measuring and outputting the quantity of liquid contents in a container of fixed geometry, preferably a cryogenic liquid Dewar container, independent of the spatial orientation and physical motions acting on the container. The detector means comprises capacitor means having a first conductor means, preferably comprising the inner container wall, or a conductive member positioned adjacent to the container inner shell wall and a second conductor means mounted inside the container in a proximately spaced and parallel relationship with respect to the first conductor means. The capacitance value is influenced by the quantity of liquid that is present in the space provided between the first and second conductor means in comparison to a base level or reference capacitance taken when the entire container volume is filled with either a gas or the cryogenic liquid. Or, the reference capacitance can relate to any known value with which other capacitance measurements can be compared. The magnitude of the capacitance value differential is directly related to the quantity of the liquid between the conductors comprising the capacitor means, and therefore provides an indication of the liquid quantity in the container.

In the case of a Dewar container having a quantity of liquefied-gas as the cryogenic liquid, such as liquid air made up of a ratio of liquid oxygen and liquid nitrogen, the capacitance value is influenced by the amount of liquid phase air that is present in the space provided between the first and second conductor means. The dielectric coefficient for the liquid phase of oxygen and nitrogen is about 1.5 times the value for the gas phase of each molecular constituent. This property causes the capacitance value to change by a similar ratio when the space between the conductors comprising the capacitor means is partially filled with the cryogenic liquid in comparison to a base level or reference capacitance taken when the entire container volume is filled with air or a gas. One embodiment of the detector apparatus of the present invention comprises a spiral ribbon of conductive material positioned in close proximity to a first conductor means provided inside the container and surrounding at least a substantial portion of the volume enclosed by the container. The first conductor means can comprise the Dewar inner container wall or a separate conductive member provided adjacent to at least a substantial portion of the inner container wall. The measured capacitance value with respect to the reference capacitance value is related to the quantity of liquid in the container. This apparatus requires additional spatial orientation information in order to indicate the inclination of the Dewar container.

Another embodiment of the detector apparatus of the present invention comprises a volumetric capacitor means having a plurality of conductors forming multiple capacitors generally covering a large portion of the volume within the Dewar. The multiple capacitors are arranged so that a given quantity of liquid produces the same capacitance measurement regardless of where the liquid resides within the container, i.e., the spatial orientation of the Dewar. Parallel plates and/or grids, or concentric cylindrical bands are used as the multiple capacitors and regardless of the Dewar orientation, some or all of the plates, grids or bands are fully or partially immersed in the liquid. The dielectric properties of the liquid in the container cause the capacitance measurement to increase as the liquid fills more of the space between the multiple capacitors. This apparatus requires additional spatial orientation information in order to indicate the inclination of the Dewar container.

The foregoing and additional advantages are characterizing features of the present invention that will become clearly apparent upon a reading of the ensuing detailed description together with the included drawings wherein:

BRIEF DESCRIPTION OF THE DRAWINGS

FIG. 5 is a block diagram of the signal processing for the volumetric capacitance apparatus shown in FIG. 4.

DETAILED DESCRIPTION OF THE INVENTION

Figure 1:
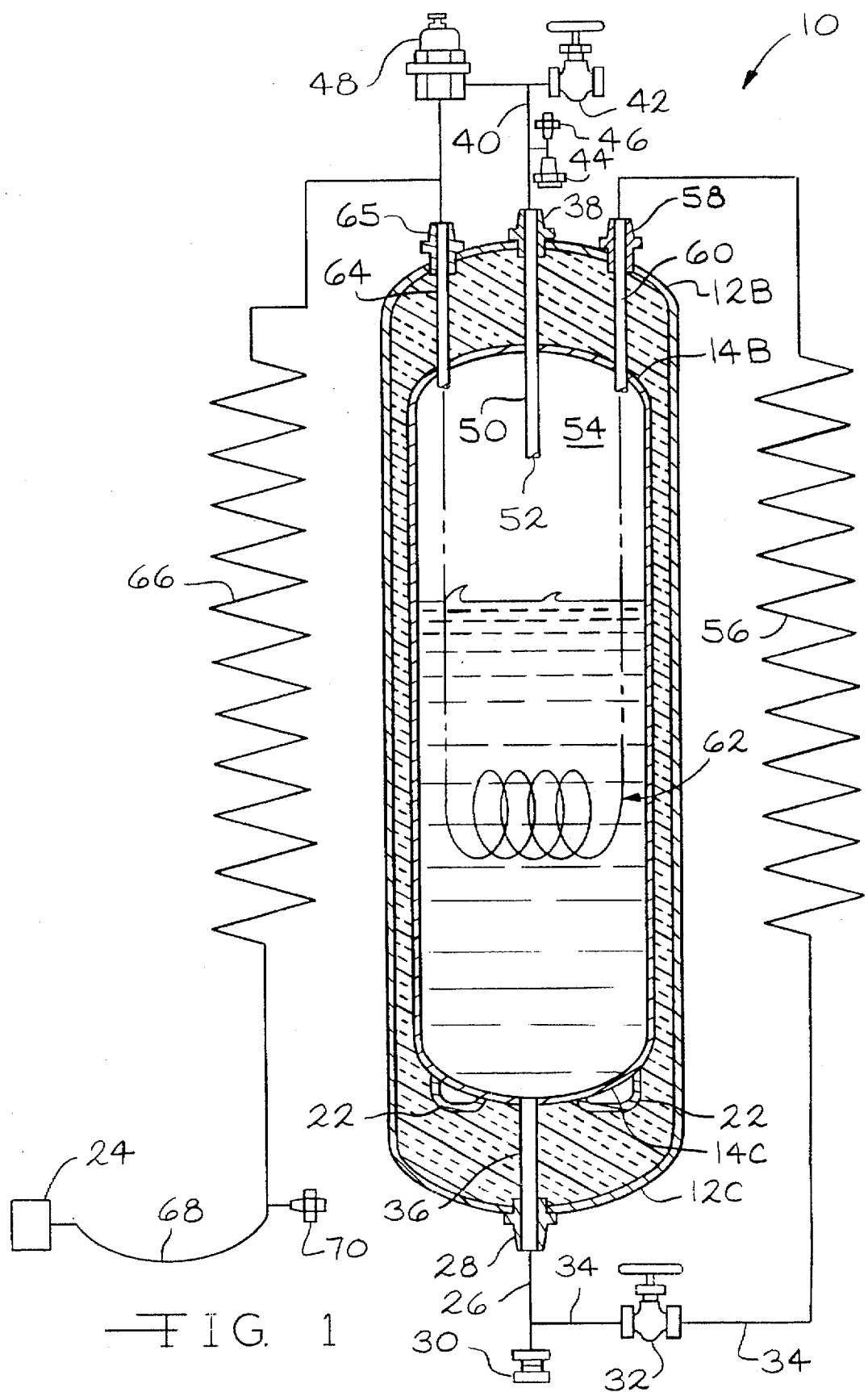
FIG. 1 is a perspective view showing a cryogenic liquid Dewar container 10, partly in schematic and partly in cross-section, that is useful with the liquid quantity sensors of the present invention.
Figure 2:
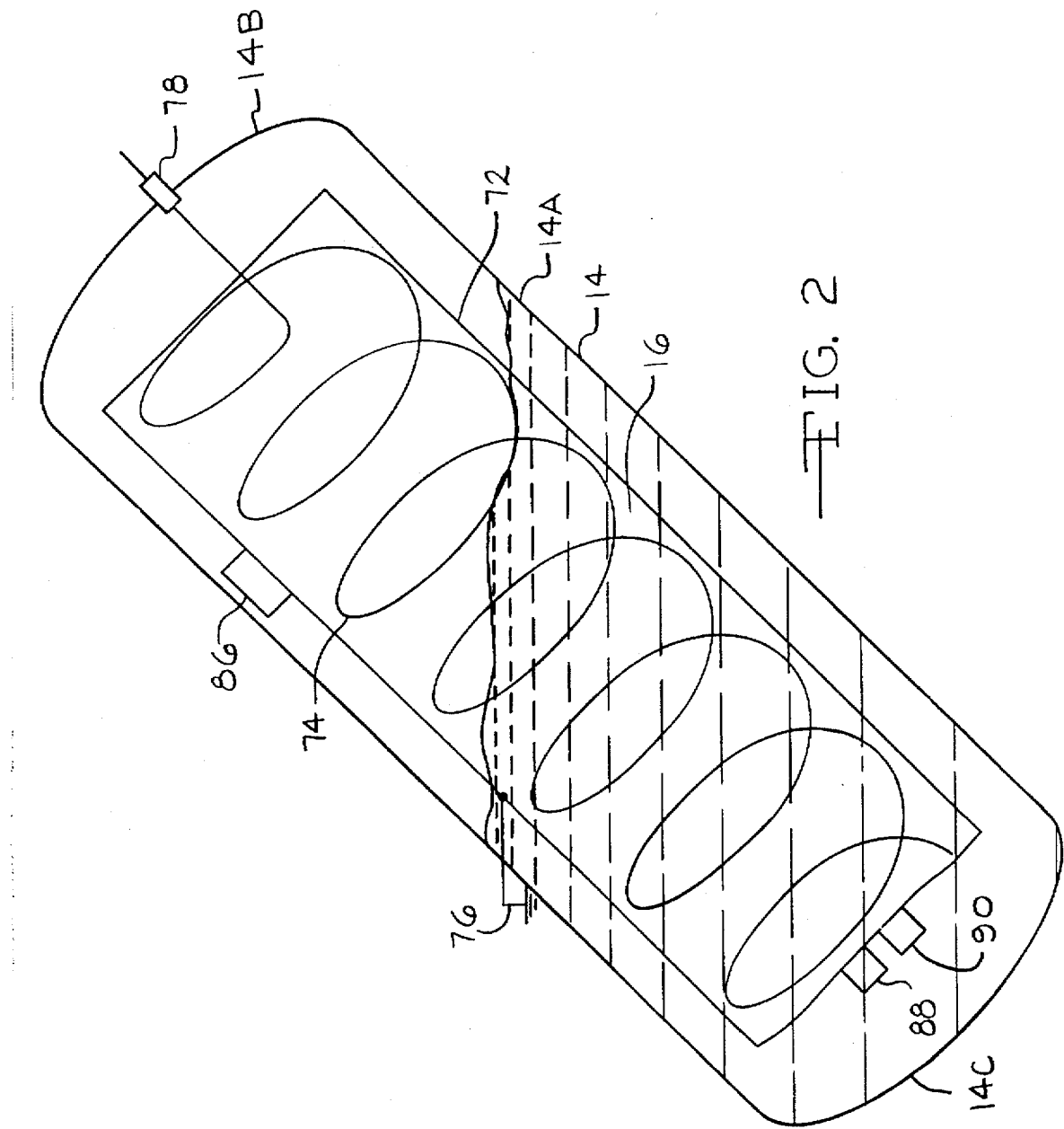
FIG. 2 is a schematic view of a spiral capacitance apparatus that is useful for detecting the quantity of cryogenic liquid 16 in Dewar container 10.
Figure 3:
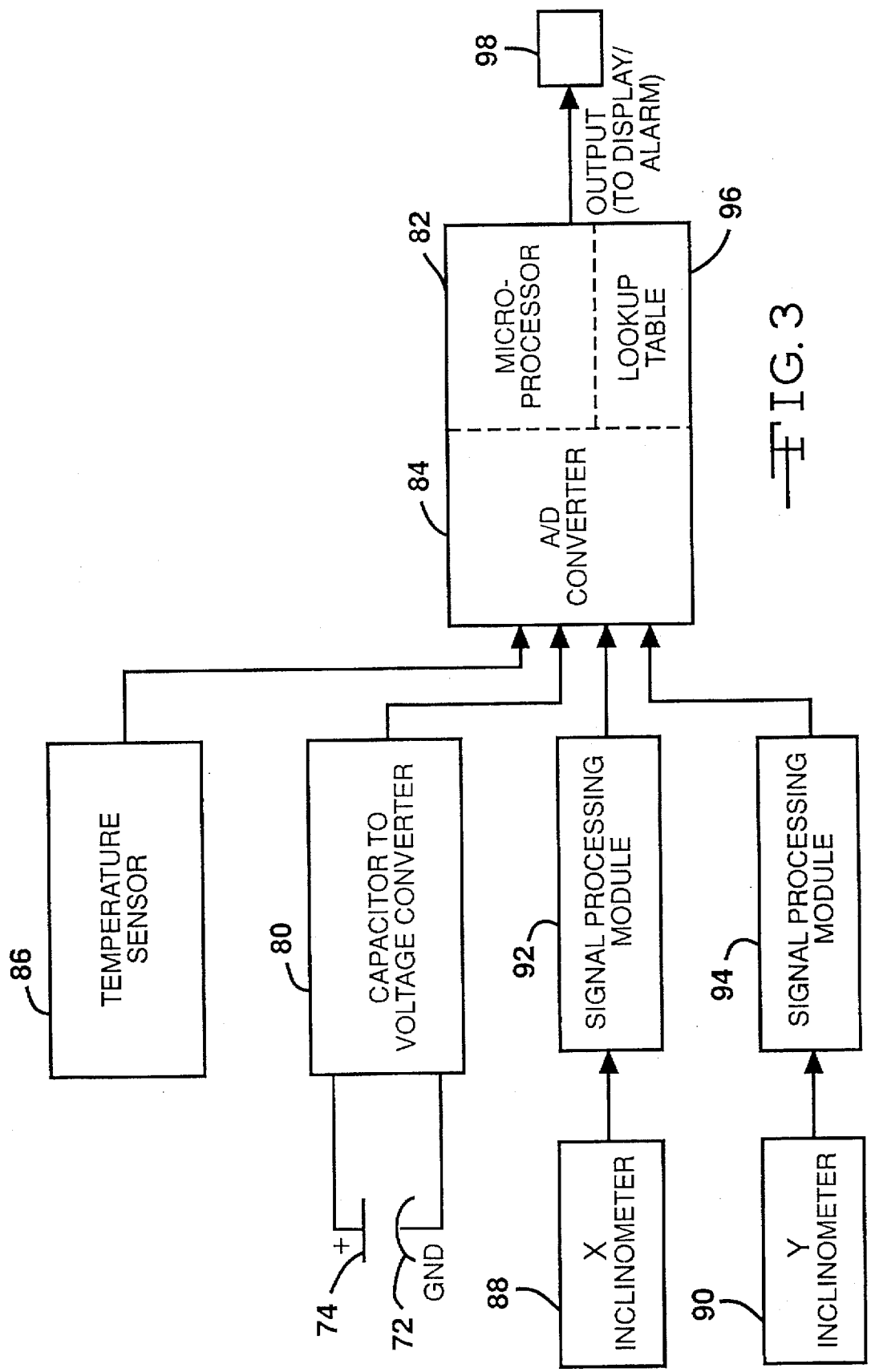
FIG. 3 is a block diagram of the signal processing for the spiral capacitance apparatus shown in FIG. 2.
Figure 4:
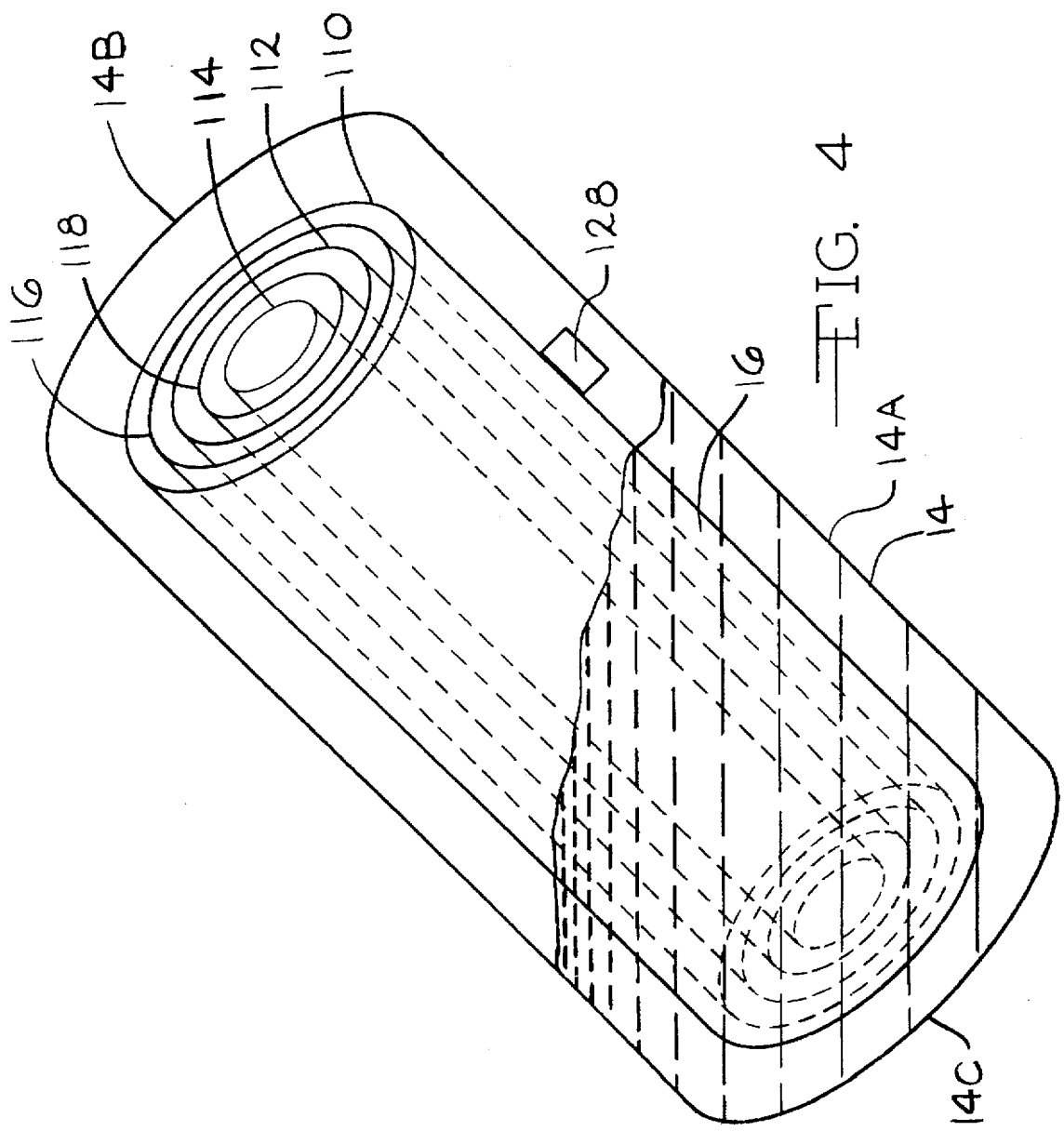
FIG. 4 is a schematic view of a volumetric capacitance apparatus that is useful for detecting the quantity of cryogenic liquid 16 in Dewar container 10.

Turning now to the drawings, FIG. 1 shows a cryogenic fluid Dewar container 10 suitable for use with the sensor means of the present invention. FIGS. 2 and 3 show one embodiment of the sensor means comprising a spiral capacitance apparatus while FIGS. 4 and 5 show another embodiment of the sensor means comprising a volumetric capacitance apparatus. Both the spiral and the volumetric capacitance apparatus are disposed inside the Dewar to detect and indicate the quantity of cryogenic fluid remaining therein. It should be understood that container 10 is merely exemplary, and in that respect, container 10 represents one embodiment of a container that is useful with the sensor means of the present invention. In other words, the present sensor means is useful with many types of containers whose shape and construction are only limited by the imagination of those skilled in the art. For example, while container 10 is shown having a generally cylindrical shape closed at both ends, the present sensor means can be adapted for use with containers having a myriad of shapes other than cylindrical and the container need not be closed.

The spiral capacitance apparatus and the volumetric capacitance apparatus will be described in detail hereinafter, but first the structure of container 10 is described. FIG. 1 is a perspective view showing the cryogenic liquid Dewar container 10, partly in schematic and partly in cross-section, and without the structure of either the spiral or the volumetric capacitance apparatus, which are deleted for the purpose of clarity. Container 10 comprises an outer container means or outer shell 12 mounted around and surrounding an inner container means or inner shell 14 provided with a cryogenic liquid 16 such as a quantity of liquefied-gas. As shown in cross-section in FIG. 1, the outer shell 12 has a generally cylindrical side wall 12A extending along and around the longitudinal axis of the container 10 with first and second dome portions 12B and 12C closing the opposed ends thereof. Similarly, the inner shell 14 has a cylindrical sidewall 14A extending along and around the longitudinal axis with first and second dome portions 14B and 14C closing the opposed ends thereof.

As further shown in FIG. 1, the space 18 formed between the inner and outer shells 12 and 14 is vacuum evacuated and provided with an insulation material 20 that helps thermally insulate the cryogenic liquid 16. A getter material 22 is mounted on the outside of the second dome 14C to absorb any residual air in the evacuated space 18 between the shells 12 and 14. Often the cryogenic liquid 16 is a liquefied air mixture having an enriched oxygen concentration that serves to supply breathable air to a pressure regulator and associated facepiece 24 (shown in block representation in FIG. 1), as is well known to those of ordinary skill in the art.

As shown schematically in FIG. 1, an input/output liquid conduit 26 extends from a nipple 28, or a similar coupling means mounted on the second dome 12C of outer shell 12. Conduit 26 leads to a quick-disconnect coupling 30 that serves as a connection means for connecting the Dewar container 10 to a pressurized liquefied-gas supply (not shown) for filling the cryogenic liquid 16 into inner shell 14. A manual shut-off valve 32 is connected to the input/output conduit 26 between nipple 28 and coupling 30 via conduit 34. The pressure of the cryogenic liquid 16 inside the inner shell 14 is preferably held at a minimum of about 60 psi.

Nipple 28 leads inside the outer shell 12 to a conduit 36 extending through the evacuated space 18 to enter the inner shell 14 in communication with the contents contained therein. Similarly, the first dome 12B of the outer shell 12 is provided with an axially positioned nipple 38 that serves to connect Dewar container 10 to exterior components located outside the enclosure of the outer shell 12. As particularly shown in FIG. 1, nipple 38 is connected by an outlet conduit 40 to a vent valve 42, burst disk 44, a pressure relief valve 46, and an economizer valve 48.

Nipple 38 leads inside the outer shell 12 to a relatively thin walled conduit 50 entering the inner shell 14 along the longitudinal axis thereof. Conduit 50 is provided with an open terminal end 52. This provides a sufficient vent space at the upper portion of the inner shell 14 above the opening 52 where a gas pocket 54 forms that prevents the inner shell 14 from being overfilled with cryogenic liquid 16. In that respect, when Dewar container 10 is being filled with cryogenic liquid 16 and with valve 42 turned to an open position, at such time as liquid 16 emerges through valve 42, the container 10 is filled to the prescribed level as defined by opening 52 in conduit 50. The terminal opening 52 of conduit 50 also provides for passage of conducting wires (not shown) associated with the spiral capacitance apparatus and the volumetric capacitance apparatus, which apparatus will be explained presently.

As schematically shown in FIG. 1, one end of conduit 34 intersects input/output conduit 26 while the other end leads to a first endothermic heat exchanger 56 mounted outside Dewar container 10. Heat exchanger 56 serves to conduct heat energy from the ambient surroundings to the cryogenic liquid 16, which preferably is liquified air, to vaporize the liquid to a gas and then to warm the gas. The warmed gas then leaves the first endothermic heat exchanger 56 and re-enters the first dome 12B of the outer shell 12 through nipple 58 leading to an inlet conduit 60 of an internal exothermic heat exchanger 62 provided inside inner shell 14. Exothermic heat exchanger 62 is shown schematically in FIG. 1 and it serves to conduct a portion of the heat energy imparted to the warmed gas by the first endothermic heat exchanger 56 to the cryogenic liquid 16 remaining inside the inner shell 14.

The outlet conduit 64 of the exothermic heat exchanger 62 connects to a nipple 65 mounted on the first dome 12B. Nipple 65 in turn leads to a second endothermic heat exchanger 66, shown schematically in FIG. 1, which is similar to the first endothermic heat exchanger 56. When the warmed gas leaving the first endothermic heat exchanger 56 moves through the exothermic heat exchanger 62, heat energy is conducted to the cryogenic liquid 16 inside the inner shell 14. The temperature of the gas in heat exchanger 62 is cooled an amount dependent on the flow rate, and the heat energy of the cryogenic liquid 16 inside inner shell 14 is raised a like amount. The cooled gas leaving the internal exothermic heat exchanger 62 then moves to the second endothermic heat exchanger 66, which serves to warm the gas to about ambient temperature. An outboard end of the second endothermic heat exchanger 66 preferably connects to a flexible tube 68 that supplies the warmed gas to the pressure regulator and an associated on-demand facepiece 24 (shown in block representation in FIG. 1), which is worn by a user breathing the air. A pressure relief valve 70 is provided adjacent to the outboard end of the second endothermic heat exchanger 66.

FIGS. 2 to 5 further show the two embodiments of the sensor means of the present invention, namely the spiral capacitance apparatus (FIGS. 2 and 3) and the volumetric capacitance apparatus (FIGS. 4 and 5) that are positionable inside inner shell 14 for detecting and indicating the quantity of cryogenic liquid 16 in Dewar container 10, independent of the spatial orientation and the physical motions acting on the container. The liquid quantity sensor of the present invention comprising the spiral capacitance apparatus will first be described.

As shown schematically in FIG. 2, the quantity of cryogenic liquid 16 is determined by the spiral capacitance apparatus using a first, endless cylindrically shaped conductor 72 extending along and around the longitudinal axis of container 10 from adjacent to dome 14B of inner shell 14 to a position adjacent to dome 14C, and a spiral shaped conductor 74, preferably comprising a helix of stainless steel wire or ribbon serving as a second conductor means. First conductor 72 is mounted inside the inner shell 14 in a coaxial relationship with respect to the longitudinal axis thereof and parallel with respect to the side wall 14A. It should be understood that the inside surface of the inner shell 14 can also serve as the first conductor for the spiral capacitance apparatus of the present invention. Cylindrical conductor 72 is connected to an electrical ground 76 while the spiral shaped conductor 74 feeds through an insulator 78 positioned in dome to a suitable power source (not shown).

Thus, conductor 74 is provided in a proximately spaced and parallel relationship with respect to the first conductor 72 with the gap therebetween remaining relatively small to comprise the spiral capacitance apparatus of the present invention. Spiral or helically shaped conductor 74 has a baseline capacitance with respect to cylindrical conductor 72 when container 10 is completely full. With some portion of the full quantity of cryogenic liquid 16 removed from the container 10, some reduced portion of conductor 72 and a respective portion of helix 72 are partially immersed in the cryogenic liquid 16. This serves to decrease the net capacitance of the capacitor. The magnitude of the capacitance decrease is equal to the ratio that the decrease in net capacitance is to the baseline capacitance measurement with the Dewar container completely full, regardless of the inclination. In the case of the baseline capacitance being derived from an inner shell 14 completely filled with cryogenic liquid 16 in comparison with the inner shell 14 partially filled, the latter capacitance measurement is a fraction of the baseline capacitance related to the lesser area of conductors 72, 74 contacted by the cryogenic liquid in relation to the area of these conductors contacted by the cryogenic liquid at the baseline measurement. In other words, the magnitude of the capacitive decrease is directly related to the reduced area of the conductors 72, 74 immersed in the liquid 16 with respect to the area of the spiral conductor 74 contacted by the liquid when container 10 is completely full. In the case of the container being about 65% full, the magnitude of the total capacitance is about 0.65 times the completely full total capacitance.

As shown in block diagram in FIG. 3, the capacitance measurement derived from the conductors 72 and 74 is sent to a converter, indicated as block 80, that in turn sends a voltage proportionate to the capacitance of the sensor means to micro-processor via an analogue-to-digital convertor, indicated as blocks 82 and 84 respectively. Micro-processor 82 serves as a computer means to process this data along with an input from a temperature sensor, indicated as block 86 in FIGS. 2 and 3 to provide a calculated cryogenic liquid quantity. The temperature measurement is fed to computer 82 via A/D convertor 84. The temperature of the cryogenic liquid is used to correct the calculated liquid quantity and provide a corrected liquid quantity output. For example, when the cryogenic liquid 16 comprises a mixture of oxygen and nitrogen, $(O_2/N_2)$, the dielectric constant of $O_2/N_2$ is a function of the temperature of the liquid and consequently, the capacitance reading will change in response to changes in the temperature for a fixed quantity of cryogenic liquid 16 contacting conductors 72 and 74.

Since the spiral capacitance apparatus of this embodiment of the present invention comprising conductors 72 and 74 provide a single capacitance measurement derived from the extent of immersion of the conductors in the dielectric cryogenic liquid 16, the angle of inclination of container 10 cannot be directly determined from this single capacitance measurement. In that regard, a two-axis inclinometer system is used to indicate the angle of inclination of container 10. The inclination system comprises an X-axis inclinometer, indicated as component 88 in FIG. 2 and block 88 in FIG. 3, and a Y-axis inclinometer, indicated as component 90 in FIG. 2 and block 90 in FIG. 3, which send inclination data to respective signal processor modules, indicated as blocks 92 and 94 in FIG. 3. Modules 92 and 94 send a voltage related to the respective inclinations about the X and Y axes to A/D convertor 84 which in turn sends digital inclination measurements related to the inclination of Dewar container 10 to computer 82. A three-axis inclination system is not required because Dewar container 10 is symmetrical about its longitudinal axis.

Computer 82 gathers and processes the data sent to it by converter 84, temperature sensor 86, and modules 92 and 94 and fits this data to tables indicated as block 96 in FIG. 3, that are stored in its memory and which are related to expected readings for these components at various fill percentages and inclinations. In that respect, it has been determined mathematically that there exists only one capacitance measurement for a given fill percent and at a specified inclination of container 10. Once a fit is found, the computer 82 then sends an output to a display, indicated as block 98 in FIG. 3. that provides the percent fill or quantity of cryogenic liquid 16 in Dewar container 10 and the angle of inclination of container 10 in a usable format. Display 98 can include a liquid low alarm, for example. when the liquid quantity is depleted to 25% of full capacity, and a man-down alarm. Various commercially available devices have been provided for the purpose of functioning to signal "man-down." The man-down device is useful with the present invention to indicate that the user of the cryogenic Dewar container 10 is not active, and may in fact be in peril.

Another embodiment of the liquid quantity sensor of the present invention comprising the volumetric capacitance apparatus is shown schematically in FIG. 4. In the volumetric capacitance apparatus, the quantity of cryogenic liquid 16 is determined using a plurality of first endless cylindrically shaped conductors 110, 112 and 114 that extend along and around the longitudinal axis of container 10 from adjacent to dome 14B of inner shell 14 to a position adjacent to dome 14C, and a plurality of second endless cylindrically shaped conductors 116 and 118 electrically connected together and alternately disposed in a proximately spaced and parallel relationship with respect to the first conductors. The second conductors 116 and 118 are preferably similar in length as first conductors 110 to 114. It should be understood that while conductors 110 to 118 are shown having a cylindrical shape, they can also be provided as plates or grids distributed throughout the volume of inner shell 14. What is important is that regardless of the shape of conductors, they are provided inside inner shell 14 in a proximately spaced and parallel relationship with respect to each other and are distributed over the entire volume enclosed by inner shell 14. The inner surface of inner shell 14 can also serve as one of the plurality of first conductors.

The first conductors 110 to 114 are connected to ground (not shown) and the second conductors 116 and 118 are provided with a positive electrical charge. With this configuration, the electrical field normally experienced in a capacitor formed from two closely spaced and parallel conductor plates is doubled by establishing measurement zones between first conductors 110 to 114 and between second conductors 116 and 118. Since the various first conductors 110 to 114 and second conductors 116 and 118 are electrically connected, the measurement zones act as one net capacitor distributed throughout the volume of the inner shell 14.

The network of first conductors 110 to 114 and related second conductors 116 and 118 has a baseline capacitance when the container 10 is completely full. However, with some portion of the full quantity of cryogenic liquid 16 removed from the container 10, some reduced portion of the first conductors 110 to 114 and second conductors 116 and 118 are partially immersed in the dielectric cryogenic liquid 16. This decreases the net capacitance charge of the capacitor, which magnitude of capacitance decrease is equal to the ratio that the decrease in net capacitance is to the baseline capacitance with the Dewar container 10 completely full, regardless of the inclination. In the case of the baseline capacitance being derived from an inner shell 14 completely filled with the cryogenic liquid 16 in comparison with the inner shell 14 partially filled with cryogenic liquid 16, the latter capacitance measurement is a fraction of the baseline capacitance related to the lesser area of conductors 110 to 118 contacted by the liquid in relation to the area of the conductors 110 to 118 contacted by the cryogenic liquid at the baseline measurement. Thus, the magnitude of the capacitance decrease is directly related to the reduced area of the cylindrically shaped first conductors 110 to 114 and second cylindrically shaped conductors 116 and 118 immersed in the liquid 16 with respect to the area of the conductors contacted by the cryogenic liquid 16 with the container 10 completely full. In the case of the container 10 being about 70% full, the magnitude of the total capacitance is about 0.70 times the completely full total capacitance.

As shown in the block diagram in FIG. 5, the capacitor comprising the first conductors 110 to 114 and second conductors 116 and 118 and collectively indicated as component 120 in FIG. 5 send a capacitor measurement to a converter, indicated as block 122, that in turn sends a voltage proportionate to the capacitance of that measurement to a micro-processor, indicated as block 124, via an analogue-to-digital converter, indicated as block 126. Micro-processor 124 serves as a computer means to process this data along with an input from a temperature sensor, indicated as block 128 in FIGS. 4 and 5, to provide a calculated cryogenic liquid quantity. The temperature measurement is fed to computer 124 via A/D converter 126 and the temperature of the cryogenic liquid is used to correct the calculated liquid quantity to provide a corrected liquid quantity output.

In that respect, it has been determined mathematically that there exists only one capacitance measurement for a given fill percent provided the first conductors 110 to 114 and the second conductors 116 and 118 comprising the volumetric capacitance apparatus are substantially distributed over the entire volume of container 10. Computer 124 gathers and processes the data sent to it by the capacitance to voltage converter 122 and temperature sensor 128 to thereby provide a calculated liquid quantity. The computer 124 then sends a quantity output to a display, indicated as block 130 in FIG. 5 that provides the percent fill of cryogenic liquid 16 in Dewar container 10. Display 130 can include a low liquid quantity alarm and a man-down alarm, as previously discussed with respect to the spiral capacitance apparatus shown in FIGS. 2 and 3.

Since the volumetric capacitance apparatus of this embodiment of the present invention comprising first conductors 110 to 114 and second conductors 116 and 118 provide one net capacitor measurement through the volume of the inner shell 14, derived through immersion of the first conductors 110 to 114 and the second conductors 116 and 118 in the cryogenic liquid 16 serving as the dielectric, the angle of inclination of container 10 is not needed to determine the quantity of cryogenic fluid. It should also be understood, that the resolution of the calculated liquid quantity is a function of the number of capacitor zones the volume of the container 10 is partitioned into. The greater the number of capacitance zones, the greater the accuracy and resolution of the liquid quantity measurement. Further, it will be apparent to those skilled in the art, that an inclinometer system, similar to that previously described with respect to the spiral capacitance apparatus can be provided to indicate the angle of inclination of the container 10 provided with the volumetric capacitance apparatus.

In Use

Dewar container 10 is intended for use by people needing to breath in a hostile environment where the atmosphere is not conducive to supporting life. In that respect and initially referring to FIG. 1, a user will first don the facepiece 24 (shown in block representation in FIG. 1) while the container 10 is carried on the back by a harness, as is well known to those of ordinary skill in the art. Inner shell 14 has previously been filled with cryogenic liquid 16. Valve 32 is then turned to an opened position and breathing beings. The cryogenic liquid 16 flows from the inner shell 14 via conduits 26 and 34 to the first endothermic heat exchanger 56 which adds heat energy to the cryogenic liquid 16 to provide for initial vaporizing and then warming of the liquid 16. The raised-energy fluid leaving the first endothermic heat exchanger 56 is then in a gaseous state near ambient temperature with the actual gas temperature dependent on the flow rate through the heat exchanger 56. This gas then moves through the internal exothermic heat exchanger 62 mounted inside the inner shell 14 where thermal energy input into the raised-energy fluid is conducted to the cryogenic liquid 16 still inside the inner shell 14. This adds heat energy to the cryogenic liquid 16 inside the inner shell 14 and causes the temperature of the gas flowing through the exothermic heat exchanger 62 to cool. The cooled gas in the exothermic heat exchanger 62 is then moved to the second endothermic heat exchanger 66 where heat energy is again conducted from the ambient surroundings to warm the gas to about ambient temperature before the gas is delivered to the facepiece 24 as a breathable air mixture. For a more detailed description of the spatial independent vaporization function of Dewar container 10, reference is made to U.S. Pat. No. 5,357,758 to Andonian, the disclosure of which is incorporated herein by reference.

The liquid quantity sensor apparatus of the present invention namely, the spiral capacitance apparatus and the volumetric capacitance apparatus are provided inside the inner shell 14 to detect and output the quantity of cryogenic liquid 16 inside the Dewar. In the case of the spiral capacitance apparatus shown in FIGS. 2 and 3, micro-processor 82 calculates a capacitance measurement related to the length of conductor 74 immersed in the cryogenic liquid 16 serving as the dielectric for the capacitor formed by conductors 72 and 74. The capacitance measurement along with the X- and Y-axes inclinometer measurements are sent to computer 82, which takes this data, computes an average percentage fill of Dewar container 10 and then selects the nearest percent fill table stored in a database input in the computer memory for a wide range of fill quantities and inclination angles to thereby produce a best fit for one fill value and angle of inclination, as previously discussed.

In the case of the volumetric apparatus shown in FIGS. 4 and 5, micro-processor 124 calculates a capacitance measurement related to the area of conductors 110 to 114, and 116 and 118 immersed in the cryogenic liquid 16 serving as the dielectric for the thusly formed capacitor. The capacitance measurement is used to compute a calculated percent fill value as the percentage that this capacitance measurement is of the baseline capacitance. This calculated fill value is corrected for the temperature of the cryogenic liquid to thereby provide a corrected fill value related to the percentage of cryogenic fluid 16 in container 10.

As further shown in the block diagrams in FIGS. 3 and 5 with respect to the spiral capacitance apparatus and the volumetric capacitance apparatus, the micro-processors 82 and 124 send the corrected fill value readings to displays 98, 130 that output the respective liquid quantities in a usable form, such as to a dial or in a digital form useful for a person breathing from the cryogenic liquid container 10 having one of the capacitor based sensor apparatus of the present invention.

The Dewar container 10 monitor can also be provided with an alarm (not shown) that sends out a detectable signal, such as a pneumatic tactile signal or a signal in an audible format such time as the supply of cryogenic liquid 16 has been depleted to about 25 percent of total capacity, for example. Further, a motion detector mechanism (not shown) can be provided that senses a lack of change of motion of the container 10 to trigger a man-down alarm, as previously discussed. For example, if a user of the present apparatus has been incapacitated due to injury and the like and has not moved for a predetermined period of time, the man-down mechanism will trigger the computer to send out a man-down alarm signal.

It can thus be seen that the present invention provides a sensor apparatus for detecting and indicating the level of liquid in a container, preferably a cryogenic liquid Dewar container, independent of the physical motions acting on the Dewar container, and independent of the spatial orientation of the container.

For a detailed discussion of another embodiment of a sensor apparatus for detecting and indicating the quantity of liquid in a container such as a cryogenic Dewar container, reference is made to simultaneously filed patent applications entitled Method And Apparatus For Determining The Quantity Of A Liquid In A Container Independent Of Its Spatial Orientation, Ser. No. 08/406,695 and "Method And Apparatus For Determining Quantity of Liquid In A Container And/Or Lack Of Motion Thereof," Ser. No. 08/406,508, which are assigned to the assignee of the present invention and incorporated herein by reference.

It is intended that the foregoing description only be illustrative of the present invention and that the present invention is limited only by the hereafter appended claims.

What is claimed is:

1. An apparatus for detecting a liquid quantity within a container means independent of the spatial orientation and physical motions acting on the container means, wherein the container means comprises an enclosed, surrounding side wall, which comprises:

a. a first conductor means provided by the surrounding side wall of the container means;

b. a second conductor means provided inside the container means in a proximately spaced and parallel relationship with respect to the surrounding side wall providing the first conductor means to provide a capacitor means, the liquid therein serving as a dielectric for the capacitor means independent of the spatial orientation of the container means;

c. a current generator means electrically connected to the capacitor means to cause equal and opposite electrical changes to form on the first and second conductor means with the liquid serving as a dielectric to thereby provide a first capacitance measurement directly related to the extent with which the first and second conductor means are at least partially immersed in the liquid;

d. inclinometer means for indicating an inclination of the container means; and e. computer means for manipulating the first capacitance measurement and the inclination of the container means with respect to a set of reference capacitance values for various percent fill quantities of the liquid in the container means at various inclinations to indicate the quantity of liquid filled in the container means at the indicated inclination.

2. The apparatus of claim 1 wherein the reference capacitance values are derived from either the liquid in the container means or a reference fluid serving as a second dielectric for a known extent of the capacitor means.

3. The apparatus of claim 1 wherein the second conductor means comprises a current carrying conductor means having a generally helically shaped configuration spiralling in a proximately spaced and parallel relationship with respect to the surrounding side wall providing the first conductor means to provide the capacitor means.

4. The apparatus of claim 1 wherein the container means has a longitudinal axis and includes an inner wall having a generally cylindrical shape closed by first and second closure means provided at opposed ends of the cylindrical shape and wherein the inner wall provides the first conductor means of the capacitor means.

5. The apparatus of claim 4 wherein the second conductor means comprises a current carrying conductor means having a generally helically shaped configuration spiralling along and about the longitudinal axis and in a proximately spaced and parallel relationship with respect to the inner wall of the container means providing the first conductor means of the capacitor means.

6. An apparatus for detecting a liquid quantity within a container means independent of the spatial orientation and physical motions acting on the container means, which comprises:
   a. first conductor means disposed inside the container means and immersable in the liquid independent of the spatial orientation of the container means;
   b. second conductor means provided inside the container means in a proximately spaced and parallel relationship with respect to the first conductor means to provide a capacitor means, the liquid therein serving as a dielectric for the capacitor means independent of the spatial orientation of the container means;
   c. current generator means electrically connected to the capacitor means to cause equal and opposite electrical changes to form on the first and second conductor means with the liquid serving as a dielectric to thereby provide a first capacitance measurement directly related to the extent with which the first and second conductor means are at least partially immersed in the liquid;
   d. inclinometer means provided to indicate an inclination of the container means; and
   e. computer means for manipulating the first capacitance measurement and the inclination of the container means with respect to a set of reference capacitance values for various percent fill quantities of the liquid in the container means at various inclinations to indicate the liquid quantity in the container means at the indicated inclination.

7. The apparatus of claim 6 wherein the reference capacitance values are derived from either the liquid in the container means or a reference fluid serving as a second dielectric for a known extent of the capacitor means.

8. An apparatus for detecting a liquid quantity within a container means independent of the spatial orientation of the container means, which comprises:
   a. first conductor means comprising a plurality of first parallel conductor members electrically connected together and disposed inside the container means;
   b. second conductor means comprising a plurality of second conductor members electrically connected together and disposed in an alternating, proximately spaced and parallel relationship with respect to the first conductor means, to thereby provide the capacitor means as alternating first and second conductor means connected in series and disposed inside the container means, the liquid therein serving as a dielectric for the capacitor means independent of the spatial orientation of the container means;
   c. current generator means electrically connected to the capacitor means to cause equal and opposite electrical charges to form on the first and second conductor means with the liquid serving as a dielectric to thereby provide a first capacitance measurement directly related to the extent with which the first and second conductor means are at least partially immersed in the liquid;
   d. inclinometer means provided to indicate an inclination of the container means; and
   e. computer means for manipulating the first capacitance measurement and the inclination of the container means with respect to a set of reference capacitance values for various percent fill quantities of the liquid in the container means at various inclinations to indicate the liquid quantity in the container means at the indicated inclination.

9. The apparatus of claim 8 wherein the reference capacitance values are derived from either the liquid in the container means or a reference fluid serving as a second dielectric for a know extent of the capacitor means.

10. An apparatus for detecting a liquid quantity within a container means independent of the spatial orientation of the container means, wherein the container means has a longitudinal axis and includes an inner wall having a generally cylindrical shape closed by first and second closure means provided at opposed ends of the cylindrical shape, the detecting apparatus comprising:
   a. first conductor means comprising a plurality of first parallel conductor members electrically connected together and disposed inside the container means;
   b. second conductor means comprising a plurality of second conductor members electrically connected together and disposed in an alternating, proximately spaced and parallel relationship with respect to the first conductor means, to thereby provide the capacitor means as alternating first and second conductor means connected in series and disposed inside the container means, the liquid therein serving as a dielectric for the capacitor means with the first conductor means provided adjacent to a sufficient portion of the cylindrically-shaped inner wall of the container means so that at least part of the first conductor means is immersed in the liquid independent of the spatial orientation of the container means;
   c. current generator means electrically connected to the capacitor means to cause equal and opposite electrical charges to form on the first and second conductor means having the liquid as the dielectric to thereby provide a first capacitance measurement directly related to the extent with which the first and second conductor means are at least partially immersed in the liquid; and
   d. computer means for manipulating the first capacitance measurement with respect to a reference capacitance value related to a given fill quantity to thereby determine the quantity of liquid filled in the container means.

11. The apparatus of claim 10 wherein the container means comprises an inner container means provided to hold a cryogenic liquid and an insulation means enclosing the inner container means in a surrounding relationship to retard ambient heat conduction and radiation to the cryogenic liquid.

12. The apparatus of claim 11 wherein the insulation means comprises an outer container means enclosing the inner container means in the surrounding relationship with an insulation material provided in an intermediate space formed between the inner and outer container means.

13. The apparatus of claim 10 wherein the first conductor means comprises a first endless conductive bank means provided adjacent to the inner wall, along and around the longitudinal axis of the container means.

14. The apparatus of claim 10 wherein a thermometer means provides a measurement of the temperature of the liquid within the container means, and wherein the computer means serves to manipulate the first capacitance measurement with respect to the temperature measurement to indicate the quantity of liquid in the container means.

15. The apparatus of claim 10 wherein the liquid comprises a cryogenic liquid.

16. The apparatus of claim 15 wherein the cryogenic liquid is comprised of a breathable mixture containing oxygen and nitrogen.

17. A method for detecting a liquid quantity within a container means independent of the spatial orientation and physical motions acting on the container means, wherein the container means comprises an enclosed, surrounding side wall, the method comprising the steps of:

a. providing a capacitor means disposed inside the container means, the capacitor means comprising a first conductor means provided by the surrounding side wall of the container means and a second conductor means provided in a proximately spaced and parallel relationship with respect to the first conductor means, the liquid therein serving as a dielectric for the capacitor means independent of the spatial orientation of the container means;

b. charging the capacitor means using a current generator means, wherein the capacitor means provides a first capacitance measurement directly related to the extent the capacitor means is immersed in the liquid in the container means serving as the dielectric;

c. deriving an inclination of the container means using an inclinometer means;

d. manipulating the first capacitance measurement with respect to a set of reference capacitance measurements derived from either the liquid in the container means or a reference fluid serving as the second dielectric for various percent fill quantities of the liquid in the container means at various inclinations to indicate the quantity of liquid in the container means at the indicated inclination; and e. utilizing at least one of the measurement of the volume of the liquid in the container means and the inclination of the container means.

18. The method of claim 17 wherein charging the capacitor means comprises applying an electrical charge to the first conductor means and applying an electrical charge to the second conductor means disposed inside the container means in a proximately spaced and parallel relationship with respect to the surrounding side wall providing the first conductor means of the capacitor means.

19. The method of claim 17 wherein the second conductor means comprises a current carrying conductor means having a generally helically shaped configuration spiralling in a proximately spaced and parallel relationship with respect to the surrounding side wall providing the first conductor means of the capacitor means, and wherein charging the capacitor means comprises applying an electrical charge to both the first and second conductor means providing the first capacitance measurement with the current carrying conductor of the second conductor means being at least partially immersed in the liquid in the container means independent of the spatial orientation of the container means.

20. An apparatus for detecting a liquid quantity within a container means independent of the spatial orientation of the container means, which comprises:

a. first conductor means comprising a plurality of concentric first cylinder members electrically connected together and disposed inside the container means;

b. second conductor means comprising a plurality of concentric second cylinder members electrically connected together and disposed in an alternating, proximately spaced and parallel relationship with respect to the first cylinder members to thereby provide the capacitor means as alternating first and second conductor means connected in series and disposed inside the container means, wherein one of the first cylinder members is disposed radially outwardly inside the container means further than any of the other first and second cylinder members as an outer most first cylinder member, the liquid therein serving as a dielectric for the capacitor means independent of the spatial orientation of the container means;

c. current generator means electrically connected to the capacitor means to cause equal and opposite electrical charges to form on the first and second conductor means with the liquid serving as a dielectric to thereby provide a first capacitance measurement directly related to the extent with which the first and second conductor means are at least partially immersed in the liquid; and d. computer means for manipulating the first capacitance measurement with respect to a reference capacitance value related to a given fill quantity to thereby determine the quantity of liquid filled in the container means.

21. The apparatus of claim 20 wherein the container means has a cylindrical shape along and around a longitudinal axis and closed by first and second closure means and wherein the alternately disposed and proximately spaced first and second cylinders are coaxially disposed inside the container means along and around the longitudinal axis thereof.

22. The apparatus of claim 20 wherein the outer most first cylinder member comprising the capacitor means is provided by an inner wall of the container means.

23. An apparatus for detecting a liquid quantity within a container means independent of the spatial orientation of the container means, which comprises:

a. first conductor means comprising a plurality of first parallel conductor members electrically connected together and disposed inside the container means;

b. second conductor means comprising a plurality of second conductor members electrically connected together and disposed in an alternating, proximately spaced and parallel relationship with respect to the first conductor means, to thereby provide the capacitor means as alternating first and second conductor means connected in series and disposed inside the container means, the liquid therein serving as a dielectric for the capacitor means independent of the spatial orientation of the container means;

c. current generator means electrically connected to the capacitor means to cause equal and opposite electrical charges to form on the first and second conductor means with the liquid serving as a dielectric to thereby provide a first capacitance measurement directly related to the extent with which the first and second conductor means are at least partially immersed in the liquid;

d. thermometer means that provides a measurement of the temperature of the liquid within the container means; and e. computer means for manipulating the first capacitance measurement with respect to a reference capacitance value related to a given fill quantity and with respect to the temperature measurement to thereby determine the quantity of liquid filled in the container means.

24. A method for detecting a liquid quantity within a container means independent of the spatial orientation of the container means, which comprises:

a. providing a capacitor means disposed inside the container means, the capacitor means comprising a plurality of concentric, first parallel cylinder members electrically connected together and a plurality of concentric, second cylinder members electrically connected together and disposed in an alternating, proximately spaced and parallel relationship with respect to the plurality of first conductor members to thereby provide the capacitor means as alternating first and second conductor means connected in series and arranged inside the container means with the liquid therein serving as a dielectric for the capacitor means independent of the spatial orientation of the container means;

b. electrically charging the capacitor means using a current generator means applying an electrical charge to the plurality of first and second parallel cylinder members, wherein the capacitor means provides a first capacitance measurement directly related to the extent the capacitor means is immersed in the liquid in the container means serving as the dielectric;

c. deriving a reference capacitance measurement from either the liquid in the container means or a reference fluid serving as a second dielectric for a known areal extent of the capacitor means;

d. manipulating the first capacitance measurement with respect to a reference capacitance value to thereby determine the quantity of liquid in the container means; and e. utilizing the measurement of the volume of the liquid in the container means.

\* \* \* \* \*